United States Patent [19]

Beer

[11] 3,946,527
[45] Mar. 30, 1976

[54] LATERAL FORCE VARIATION CORRECTION OF PNEUMATIC TIRES

[75] Inventor: Klaus Beer, Akron, Ohio

[73] Assignee: The Goodyear Tire & Rubber Company, Akron, Ohio

[22] Filed: Aug. 26, 1974

[21] Appl. No.: 500,221

[52] U.S. Cl............ 51/281 R; 51/DIG. 33; 73/146; 157/13
[51] Int. Cl.² ........................................... B24B 1/00
[58] Field of Search .......... 51/165 R, 106 R, 281 R, 51/289 R, DIG. 33; 73/146, 66; 157/13; 29/22, 159.1; 82/47, 48

[56] References Cited
UNITED STATES PATENTS

| | | | |
|---|---|---|---|
| 3,543,576 | 12/1970 | Bishop | 51/DIG. 33 |
| 3,553,903 | 1/1971 | Christie | 51/DIG. 33 |
| 3,574,973 | 4/1971 | Rader | 157/13 X |
| 3,724,137 | 4/1973 | Hofelt | 51/DIG. 33 |
| 3,739,533 | 6/1973 | Iida | 51/165 R X |
| 3,849,942 | 11/1974 | Monajjem | 51/165 R |

*Primary Examiner*—Al Lawrence Smith
*Assistant Examiner*—Nicholas P. Godici
*Attorney, Agent, or Firm*—F. W. Brunner; M. L. Gill

[57] ABSTRACT

A method of reducing the lateral force variation exerted by a rotating pneumatic tire on its supporting surface, which method comprises mounting the tire on a rotatable rim, inflating the tire to a preselected pressure, urging the tire against a load roll with a preselected force, rotating the tire to determine the lateral force variation, grinding the axially outer rib of the tire on the side of the tire in the direction of the maximum lateral force at the point of the maximum lateral force and grinding the other axially outer rib at the point of maximum variation from the maximum lateral force.

6 Claims, 5 Drawing Figures

LATERAL FORCE VARIATION CORRECTION OF PNEUMATIC TIRES

The foregoing abstract is not to be taken as limiting the invention of this application, and in order to understand the full nature and extent of the technical disclosure of this application, reference must be made to the accompaying drawings and the following detailed description.

BACKGROUND OF THE INVENTION

The present invention relates to a method of reducing the lateral force variation exhibited by a tire during rotation.

It is known that due to the nature of a pneumatic tire and the present methods of manufacturing pneumatic tires, such tires exhibit at least some degree of non-uniformity. The non-uniformity in the tire has been measured and studied in many ways. Some examples of measurements of the non-uniformity of the tire include balance, tread gauge variation, radial and lateral runout, radial and lateral force variation, and an average or net lateral force exerted in one direction during rotation.

Various methods have been proposed and utilized to reduce certain of these irregularities. For example, radial force variation can be reduced by grinding both axially outer ribs of the tire at the point of high radial force. The tire tread surface can also be ground to reduce radial runout. Further, it has been proposed that one axially outer rib can be ground completely around the tire to reduce the net axial thrust or net lateral force exhibited by the tire during rotation.

BRIEF DESCRIPTION OF THE INVENTION

The present invention relates specifically to a method of reducing the lateral force variation exerted by the tire on its supporting surface. Applicant has discovered that the lateral force variation can be reduced by grinding the axially outer rib of the tire on the side of the tire in the direction of the maximum lateral force at the point of maximum lateral force and grinding the other axially outer rib at the point of maximum variation from the maximum lateral force. By use of computer control systems the lateral force variation can be monitored and the proper area of each axially outer rib ground in a continuous operation. The grinding and monitoring process can be continued for several rotations of the tire. Only a very small amount of rubber is ground from the outside rib in selected portions until the lateral force variation is reduced to a predetermined level.

It is an object, therefore, of the present invention to provide a method of reducing the lateral force variation exhibited by a pneumatic tire.

Other objects will be in part apparent and in part pointed out more in detail hereinafter.

DETAILED DESCRIPTION OF THE INVENTION

Figure 1:
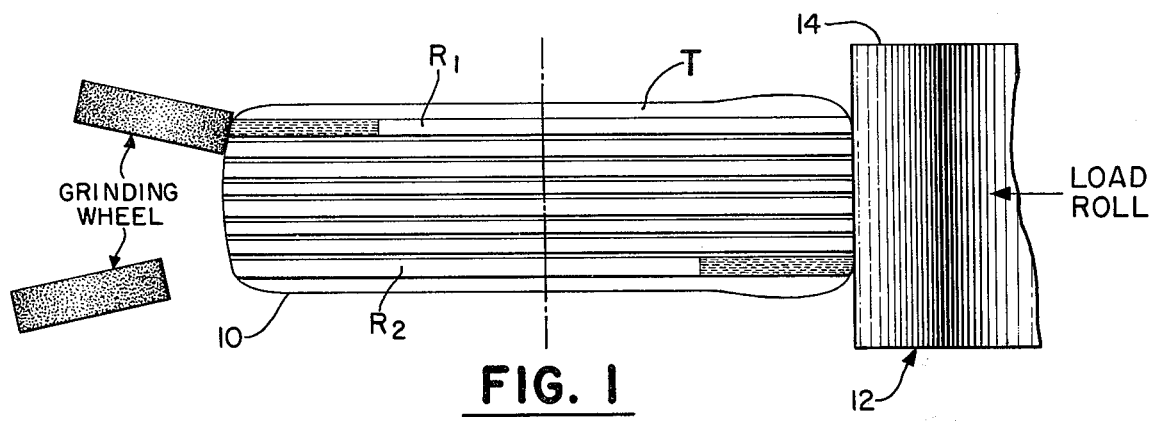
FIG. 1 is a schematic illustration of a tire being tested on a force variation machine and ground according to the present invention.

With reference to the drawings and in particular FIG. 1, there is illustrated a tire 10 being tested on a force variation machine 12, only part of which is schematically illustrated. The particular force variation measuring machine illustrated is an axis vertical type in which the tire is rotated in a horizontal plane with its axis of rotation extending in vertical directions. For purposes of this invention, it is deemed immaterial whether an axis vertical type force variation machine is utilized or some other type force variation machine such as an axis horizontal machine is utilized.

In the operation of the force variation machine the tire 10 is urged against the rotatable load roll 14. The tire 10 is rotated and sensing means (not illustrated) detect the variation in radial force exerted as well as the lateral force variation exerted by the tire 10 on the load wheel 14. Since force variation machines and tire grinding machines as well as control equipment for operating these machines are known to those skilled in the art, no further description of the apparatus utilized in performing the present invention will be presented herein.

For purposes of discussing forces exhibited by the tire and in order to maintain continuity with respect to the direction of forces throughout the specification, the forces exerted by the tire on the load wheel will be referred to rather than the reaction of the load wheel against the tire. Also, for purposes of clarity and illustration, lateral forces will be referred to as exhibited on an axis vertical machine and, therefore, will from time to time be referred to as "up" and "down" and the axially outer ribs as "top" and "bottom" ribs. It will be appreciated that on an axis horizontal machine such forces would be acting in horizontal planes.

Figure 2:
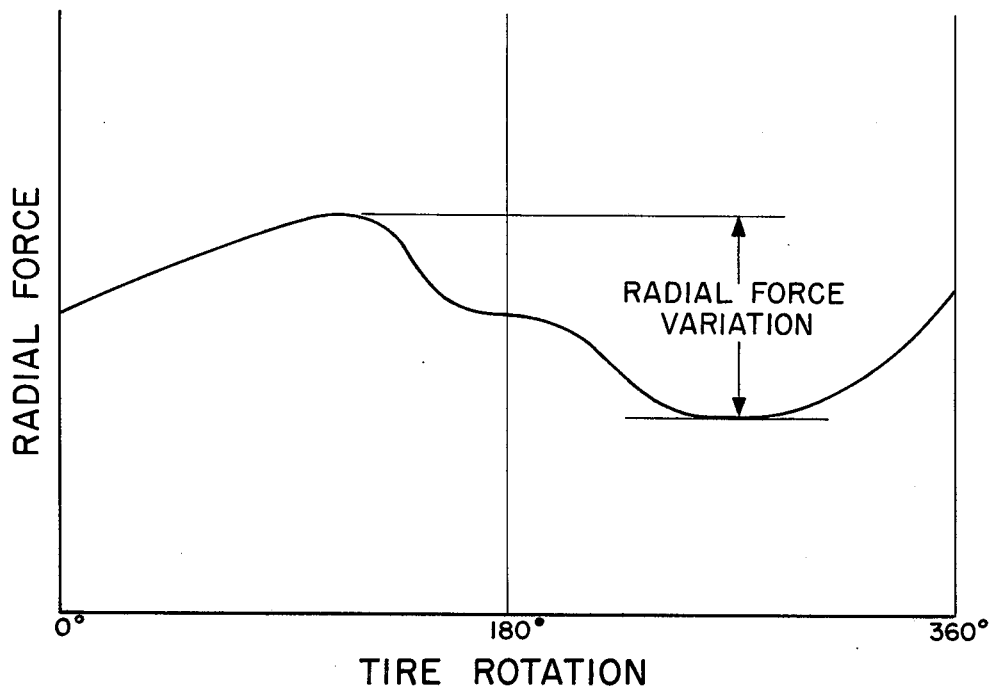
FIG. 2 is a graph schematically illustrating the radial force variation of a pneumatic tire.

With reference to FIG. 2, the radial force variation curve of a tire is schematically illustrated throughout a 360° rotation of the tire. In the past it has been known to reduce the magnitude of this radial force variation by grinding at least both axially outer ribs of the tire at the point of maximum force.

Figure 3:
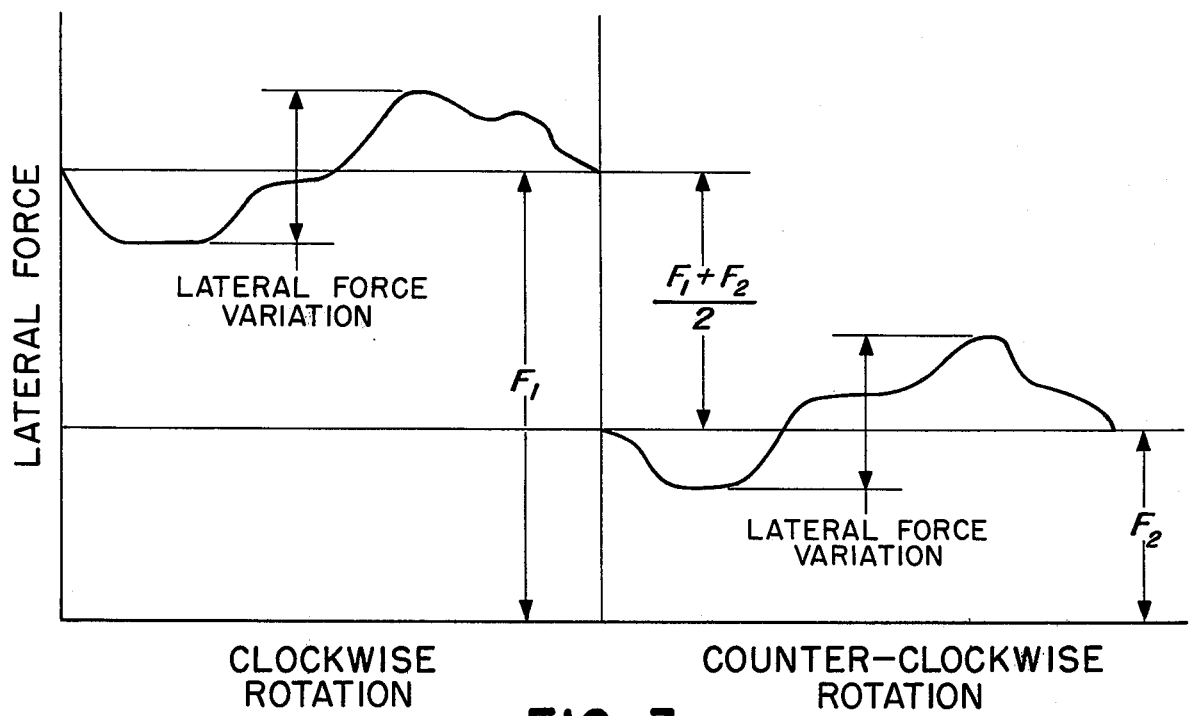
FIG. 3 is a graph schematically illustrating the lateral force variation of a tire for each of two directions of rotation.

With reference to FIG. 3, there is illustrated the lateral force variation exerted by a tire on its supporting surface both when it is rotated clockwise when viewed from above and when it is rotated counter clockwise as viewed from above. It will be observed that the average lateral force $F_1$ when the tire is rotated clockwise is different from, and in the specific tire illustrated greater than, the average lateral force $F_2$ exerted on the roll when the tire is rotated in a counter clockwise direction. This difference in average lateral force exerted by the tire is due to the fact there are certain characteristics in a tire which can result in an average lateral force or thrust being exerted by the tire, which force is dependent upon the direction of rotation. This average, or net lateral force, is sometimes referred to as "conicity" or "pseudo camber" and is equal to ½ ($F_1$ + $F_2$) as illustrated in FIG. 3. Further, there are other factors present in a tire which can cause a variation in the lateral force exerted by a tire on its supporting surface which factors are substantially unaffected by the direction of rotation.

It has been proposed in the past that the "conicity" or "pseudo camber" can be reduced by grinding one axially outer rib of the tire completely around the tire. It has also been proposed that such process can be practiced by grinding one axially outer rib entirely circumferentially about the tire to a greater extent than the other axially outer rib is ground completely around the tire. This process will not be discussed further herein since it is known in the art and is discussed extensively in U.S. Pat. No. 3,739,533.

Figure 4:
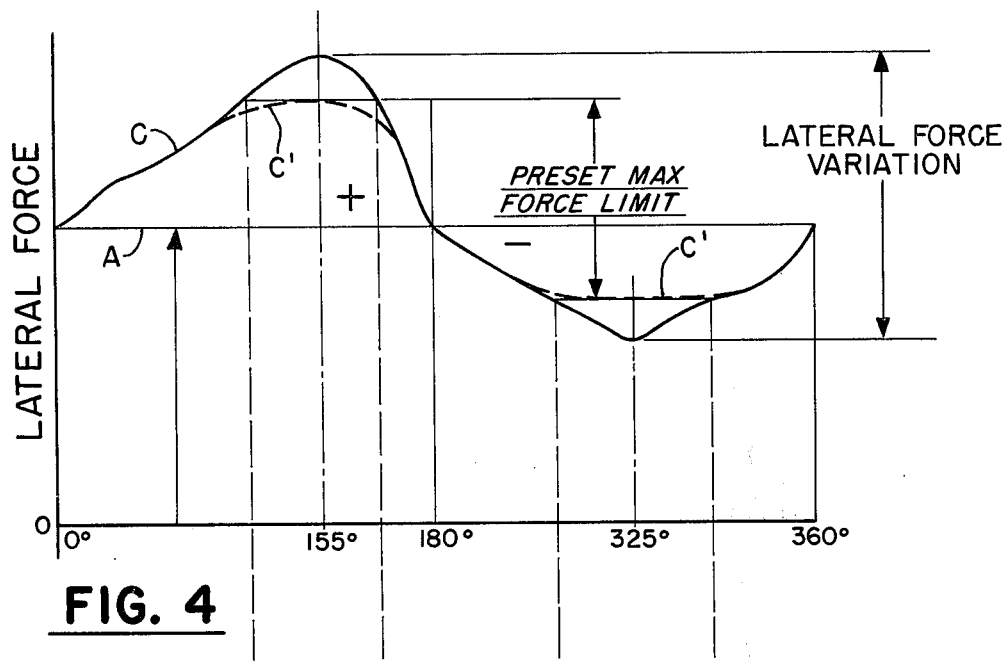
FIG. 4 is a graph schematically illustrating the lateral force variation of a tire as rotated through 360° in one direction.

More particularly and with reference to FIG. 4, there is illustrated a line A representing the average lateral force exerted by the tire 10 on its supporting surface throughout 360° of revolution in one direction. About the average lateral force line A there exists a variation in lateral force known as lateral force variation and depicted by the curve C. Therefore, with respect to the specific example illustrated, the lateral force exerted by the tire 10 on the load roll varies from a maximum up force at the 155° point to a minimum up force at the 325° point.

In accordance with the present invention, a maximum allowable difference between the maximum and minimum lateral forces is determined and pre-set lateral force variation limits are specified as illustrated in FIG. 4. As indicated on FIG. 5, a pre-selected maximum amount of grind is determined and if automatic grinding equipment is utilized, as would be the normal procedure, this limit is set into the machine such that the grinding operation will be discontinued if the pre-selected maximum grind is attained. This maximum grind limit is generally selected to assure that the general appearance of the tire is not deteriorated. With respect to passenger car tires, the maximum amount of rubber removed is preferably not greater than 35 thousandths of an inch. Thus, the grinding operation will be conducted on a tire until such time as the plus and minus forces are reduced to the pre-set force variation limits or the maximum amount of rubber permissible has been removed from one or the other of the axially outer ribs.

Figure 5:
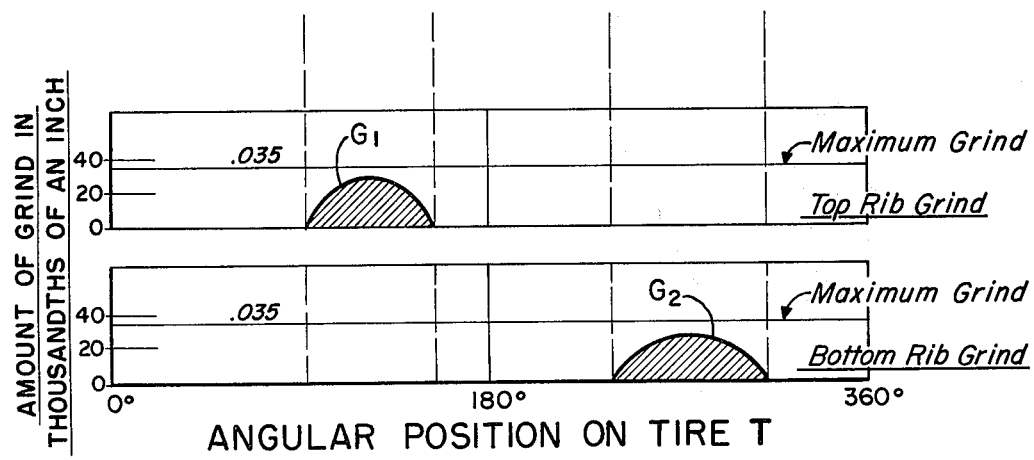
FIG. 5 is a graph schematically illustrating the amount of grinding performed on the tire whose lateral force variation is illustrated in FIG. 4.

FIG. 5 is a graphic illustration of the amount and location of the grinding performed on the tire in accordance with the present invention. The grinding performed on the top and bottom ribs of the tire is different and, therefore, the graph of FIG. 5 illustrates the grinding on each of the two ribs separately. Further, FIGS. 4 and 5 are aligned vertically with respect to each other and illustrate the same 360° rotation of the tire such that the respective grinding of the ribs can be easily aligned and compared with the force variation curve.

It will be observed in FIG. 4 that the maximum lateral force occurs at the 155° point on the tire. Since the force is directed upwardly at this point of maximum lateral force, the upper rib on the tire 10 is ground a slight amount at this point on its circumference. Further, the maximum variation from the maximum lateral force exerted by the tire on the load roll occurs at the 325° point on the circumference of the tire. Therefore, in accordance with the present invention, the other axially outer rib or the lower rib is ground a slight amount at this point on its circumference. Thus, it can be seen that in accordance with the present invention, rubber is removed from the surface of the axially outer rib of the tire on the side of the tire in the direction of the maximum lateral force at the point of maximum lateral force and a small amount of rubber is removed from the axially outer rib on the opposite side of the tire at the point of maximum variation from the maximum lateral force.

In practice, only a very slight amount of rubber is removed from the respective points on the respective axially outer ribs during each revolution of the tire. The above-described procedure therefore is repeated for a multiplicity of rotations of the tire until the lateral force variation is reduced to the pre-selected maximum force variation or the maximum allowable grind limit on either the upper or lower rib has been obtained. The lateral force variation may be reduced to the pre-set limit in just a few rotations of the tire or it can require as much as 10 to 20 grind cycles or more. The lateral force variation curve of a tire which has been brought within the specified lateral force variation limits may appear similar to curve C' in FIG. 4 and the amount of grind equal to the curves $G_1$ and $G_2$ of FIG. 5.

It will be appreciated that the average lateral force represented by the curve A may be below the zero reference line and the maximum lateral force may be exerted in a downward direction. In this case the bottom rib would be ground at the point of maximum lateral force and the top rib would be ground at the point of maximum variation from the maximum lateral force.

Further, if the average lateral force A is close to or equal to zero and and the curve C varies from a maximum above zero to a maximum below zero which maximums are equal, then in that event, either the maximum upward or maximum downward force can be considered the "maximum lateral force" and the principle applied in the same manner. Grind the surface of the axially outer rib of the tire on the side of the tire in the direction of maximum lateral force at the point of maximum lateral force and grind the other axially outer rib at the point of maximum variation from the maximum lateral force. The respective grinding of the ribs will be the same, in this case, whether the upward force or the downward force is chosen as the "maximum lateral force".

It will be also appreciated that the force directions could also be applied to an axis horizontal force variation measuring machine and thus the directions of the lateral force variation would accordingly be right and left with appropriate adjustments to proper rib to be ground.

As noted previously, all of the forces referred to in this specification and claims are the forces exerted by the tire on the load wheel. It will be appreciated, however, that one may also measure the forces exerted by the load wheel on the tire. These forces will be equal in magnitude but opposite in direction to those discussed throughout this specification. Therefore, the maximum lateral force exerted by a tire on the load wheel will be equal in magnitude but opposite in direction to the maximum lateral force exerted by the load wheel on the tire. Therefore, if one chooses to measure the force exerted by the load wheel on the tire he should remove rubber from the radially outer surface of the axially outer rib on the side of the tire opposite the direction of maximum lateral force at the point of maximum force and remove rubber from the other axially outer rib at the point of maximum variation from the maximum lateral force. In effect, this is the same process as described above with respect to the forces of the tire acting on the load wheel and, therefore, is deemed the same process as claimed herein.

While certain representative embodiments and details have been shown for the purpose of illustrating the invention, it will be apparent to those skilled in this art that various changes and modifications may be made therein without departing from the spirit or scope of the invention.

What is claimed is:

1. A method of reducing the lateral force variation exerted by a pneumatic tire on its supporting surface comprising; determining the direction and position on the tire with respect to the circumference of the tire of the maximum lateral force exerted by the tire on its supporting surface during rotation of the tire; removing a larger amount of rubber from the radially outer surface of the axially outer rib of the tire on the side of the tire in the direction of the maximum lateral force at the area of maximum force than from any other area of said axially outer rib, determining the position on the tire of the maximum variation of lateral force from the maximum lateral force, and removing a larger amount of rubber from the radially outer surface of the other axially outer rib at the area of maximum variation from the maximum lateral force than from any other area of said other axially outer rib.

2. A method as claimed in claim 1 comprising continuously monitoring the lateral force variation of the tire and removing rubber in accordance with the process of claim 1 for a plurality of revolutions of the tire.

3. A method as claimed in claim 2 wherein the lateral forces and the locations thereof on the tire are determined by mounting the tire on a rotatable rim and inflating the tire to a predetermined internal pressure, applying a predetermined external load to the tire, rotating the tire about an axis of rotation and measuring the lateral force exerted by the tire on its supporting surface.

4. A method as claimed in claim 1 further including determining the maximum lateral force variation, selecting a maximum acceptable lateral force variation and repeating the steps of claim 1 for a plurality of revolutions of the tire until the lateral force variation is reduced to said pre-selected maximum.

5. A method as claimed in claim 1 wherein the rubber is removed by grinding and further including determining a maximum allowable extent of grinding on a rib of the tire and continuing the process of claim 1 for a plurality of revolutions of the tire no longer than until said pre-selected maximum amount of grind is achieved or the maximum lateral force variation is reduced to a pre-selected maximum whichever comes first.

6. A method as claimed in claim 3 wherein the rubber is removed by grinding and further including determining a maximum allowable extent of grinding on a rib of the tire and continuing the process of claim 3 for a plurality of revolutions of the tire no longer than until said pre-selected maximum amount of grind is achieved or the maximum lateral force variation is reduced to a pre-selected maximum whichever comes first.

* * * * *